US011130220B2

(12) United States Patent
MacArthur et al.

(10) Patent No.: US 11,130,220 B2
(45) Date of Patent: Sep. 28, 2021

(54) APPARATUS AND METHOD FOR INSTALLATION OF DOOR CHECKER

(71) Applicant: Honda Motor Co., Ltd., Tokyo (JP)

(72) Inventors: Benjamin B. MacArthur, Barrie (CA); Benjamin DeBoer, Ancaster (CA); Stuart Snape, Minesing (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/676,268

(22) Filed: Nov. 6, 2019

(65) Prior Publication Data

US 2021/0129304 A1    May 6, 2021

(51) Int. Cl.
*B25B 27/14* (2006.01)
*B62D 65/06* (2006.01)
*B25B 27/00* (2006.01)
*E05C 17/20* (2006.01)

(52) U.S. Cl.
CPC .......... *B25B 27/14* (2013.01); *B25B 27/0035* (2013.01); *B62D 65/06* (2013.01); *E05C 17/203* (2013.01)

(58) Field of Classification Search
CPC ..................................................... B25B 27/14
USPC .......................................................... 29/278
See application file for complete search history.

(56) References Cited

U.S. PATENT DOCUMENTS

| 3,783,496 | A | * | 1/1974 | Siler | ....................... B23P 19/12 |
| | | | | | 29/464 |
| 4,744,135 | A | * | 5/1988 | Roels | .................. B25B 27/0035 |
| | | | | | 29/267 |
| 5,562,001 | A | | 10/1996 | Bell | |
| 2019/0041297 | A1 | | 2/2019 | Zhou et al. | |

FOREIGN PATENT DOCUMENTS

| JP | 4757184 B2 | 8/2011 |
| KR | 19980017839 U | 7/1998 |
| KR | 19980044538 U | 9/1998 |

* cited by examiner

*Primary Examiner* — Lee D Wilson
*Assistant Examiner* — Jonathan G Santiago Martinez
(74) *Attorney, Agent, or Firm* — American Honda Motor Co., Inc.; Mark E. Duell

(57) ABSTRACT

An apparatus for installation of a door checker is provided. The apparatus includes a handle, an actuator coupled to the handle, and a hook member having a first end coupled to the actuator and a second end configured to engage with a bolt-hole of a door checker. The actuator includes a body, a push mechanism coupled to the body, a pin member at least partially disposed within the body and coupled to the push mechanism, and a locking element radially disposed within the pin member.

14 Claims, 6 Drawing Sheets

APPARATUS AND METHOD FOR INSTALLATION OF DOOR CHECKER

BACKGROUND

Various techniques have been developed to install a door checker in a vehicle. The door checker is typically installed on the door of the vehicle and its function is to stabilize the door and to not let it over extend. The checker must be in an open (or extended) position to be bolted to the vehicle body. During installation, the door checker may be initially configured to be in a retracted state within the door body. Users may have to manually pull the door checker to extend from the door body and to bolt one end of the door checker to the vehicle body. It may require substantial physical effort to extend the door checker from the door body and to further ensure that the door checker stays in that state until one end of the door checker is bolted to the vehicle body. This may also increase an overall installation time of the door checker.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an apparatus may be provided for installation of a door checker. The apparatus may include an actuator and a hook member that may include a first end coupled to the actuator. The actuator may include a body and a push mechanism coupled to the body. The actuator may further include a pin member at least partially disposed within the body and coupled to the push mechanism. The actuator may further include a locking element that may be radially disposed within the pin member.

According to another embodiment of the disclosure, an apparatus may be provided for installation of a door checker. The apparatus may include a handle and an actuator that may be coupled to the handle. The apparatus may further include a hook member that may include a first end coupled to the actuator and a second end that may be configured to engage with a bolt-hole of a door checker. The actuator may include a body and a push mechanism coupled to the body. The actuator may further include a pin member at least partially disposed within the body and coupled to the push mechanism. The actuator may further include a locking element that may be radially disposed within the pin member. When the push mechanism is in an engaged state, the pin member may be configured to linearly extend from the body along a first direction and retract the locking element within the pin member, so as to mate the pin member with a bolt insertion-hole of a door holder. When the push mechanism is released from the engaged state, the locking element may be configured to radially protrude from the pin member to lock the pin member to the bolt insertion-hole.

According to another embodiment of the disclosure, a method may be provided for installation of a door checker. The method may include providing an apparatus that may include an actuator and a hook member that may have a first end coupled to the actuator. The actuator may include a body, a push mechanism coupled to the body, a pin member at least partially disposed within the body and coupled to the push mechanism, and a locking element radially disposed within the pin member. The method may further include engaging a second end of the hook member with a bolt-hole of the door checker and setting the push mechanism in an engaged state to linearly extend the pin member from the body along a first direction and retract the locking element within the pin member, so as to mate the pin member with a bolt insertion-hole of a door holder. The method may further include releasing the push mechanism from the engaged state to radially protrude the locking element from the pin member to lock the pin member to the bolt insertion-hole.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
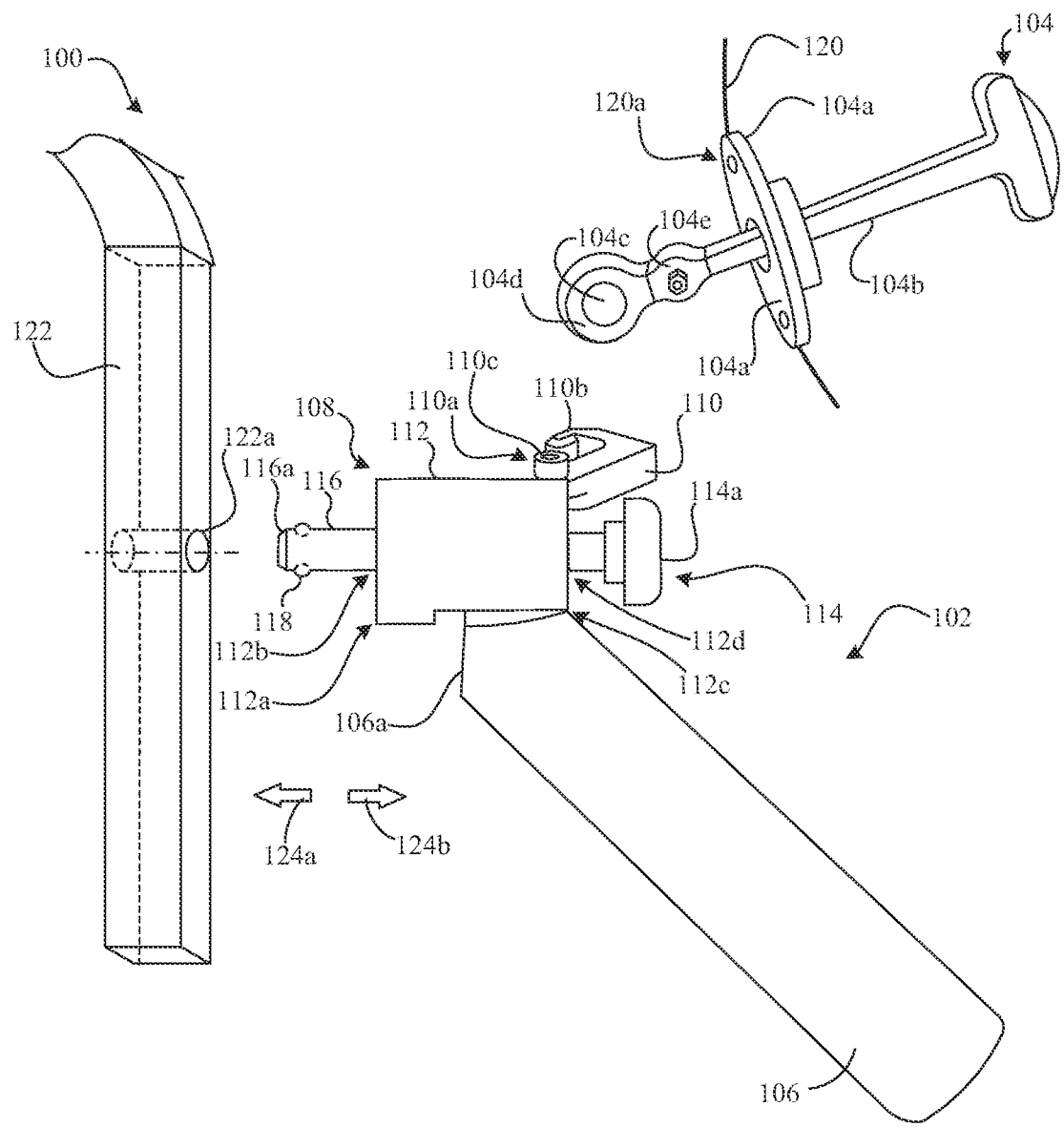
FIG. 1 is a diagram that illustrates an apparatus for installation of a door checker, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in an apparatus for installation of a door checker in a vehicle. Exemplary aspects of the disclosure may provide an apparatus as a handheld device that efficiently opens the door checker so that the door checker can be fastened to the door holder of a vehicle. The apparatus includes a hook that may engage with a bolt-hole of the door checker along with a pin member and a retractable locking element in the pin member to mate and lock to a bolt insertion-hole of the door holder. In conventional solutions, users have to manually pull out the door checker by hand or using multiple tools while maintaining its state till the door checker is fastened to the door holder. This may create accessibility issues, especially for users who try to manually install the door checker, as the installation area between the door body and door holder can become quite narrow.

In contrast, using the disclosed apparatus, users don't have to use multiple tools, apply difficult maneuvers, or excessive force to pull out the door checker. Once the hook is locked to the door checker and the pin member is locked to the door holder, users may have to only open the door slightly to pull out the door checker from the door body. The door checker may be pulled out merely by virtue of the weight of the door body. Once the door checker is pulled out, the bolt-hole of the door checker can be easily fastened to the bolt-insertion hole of the door holder. Additionally, the apparatus may be provided with a handle having a wedge shaped profile so as to offer improved handling while accessing the installation area between the door holder and the door body. With the improved handling and ease of use, overall installation time for the door checker may be significantly reduced, while preventing scratches or damage to the door body.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a diagram that illustrates an apparatus for installation of a door checker, in accordance with an embodiment of the disclosure. With reference to FIG. 1, there is shown a diagram 100 of an apparatus 102 for installation of a door checker 104. The apparatus 102 may include a handle 106, an actuator 108 that may be coupled to the handle 106, and a hook member 110 that may be coupled to the actuator 108. The actuator 108 may include a body 112, a push mechanism 114 coupled to the body 112, and a pin member 116 at least partially disposed within the body 112 and coupled to the push mechanism 114. The actuator 108 may further include a locking element 118 that may be radially disposed within the pin member 116. The apparatus 102 may also include other components, which are omitted from the disclosure for the sake of brevity.

In the diagram 100, there is also shown a door body 120 and a door holder 122 of a vehicle (not shown). Initially, the door checker 104 may be configured to be in a retracted state within the door body 120. The apparatus 102 may be configured to extend the door checker 104 from the door body 120 towards the door holder 122 of the vehicle (not shown). The door checker 104 may be configured to hold the door body 120 against the door holder 122 in one of a number of desired positions, for example, a one-quarter open position, a half-open position, a three-quarter open position, or a fully-open position, and the like.

The door checker 104 may include a checker housing 104a and a checker arm 104b that may be slidably coupled to the checker housing 104a. The checker housing 104a may be mounted on the door body 120 through a suitable fastening implement, for example, a screw, a rivet, and the like. The checker arm 104b may include a bolt-hole 104c that may be disposed at a first arm end 104d of the door checker 104. The bolt-hole 104c may be configured to receive a bolt (not shown) so as to fasten the checker arm 104b of the door checker 104 with the door holder 122. When fastened, the checker arm 104b may be at least partially disposed within the door body 120 and configured to slide-in or slide-out from the door body 120 towards the door holder 122 through the checker housing 104a. Additionally, the door checker 104 may also include a checker pivot point 104e that may facilitate a suitable degree of freedom for the door body 120 to swing against the door holder 122 at the desired position.

The door body 120 may include a suitable design, a suitable structure, and a suitable configuration of a vehicle door (not shown) and may be configured to be hinged against the door holder 122. The door body 120 may include a checker housing region 120a that may be configured to receive the door checker 104. The door holder 122 may form a hinged connection with the door body 120 through the door checker 104. The hinged connection may be formed by coupling the bolt-hole 104c of the door checker 104 with a bolt insertion-hole 122a of the door holder 122 through a suitable fastening element, for example, a bolt (not shown).

The handle 106 of the apparatus 102 may be an elongated handheld structure having gripping provisions to allow a user to hold the apparatus 102. In one embodiment, the handle 106 may be a substantially cylindrical structure and may include a first portion 106a shaped to a wedge profile. One of wedge faces of the first portion 106a may have provisions to support the actuator 108 on the handle 106 through a permanent joint or a suitable fastening arrangement, for example, a screw, a bolt and nut, and the like. The actuator 108 may be configured to be coupled with the door holder 122 to allow the checker arm 104b of the door checker 104 to extend from the door body 120 towards the door holder 122, by virtue of the weight of the door body 120. The actuator 108 may include the body 112, the push mechanism 114, the pin member 116, and the locking element 118. The actuator 108 may also include additional mechanical components that are omitted from the disclosure for the sake of brevity.

The body 112 of the actuator 108 may act as a housing for the push mechanism 114 and the pin member 116 and may be configured to be coupled with the handle 106 through a suitable fastening arrangement. The body of the actuator 108 may have a substantially cylindrical structure or any other suitable structure, for example, a rectangular structure, a hexagonal structure, and the like. A first end 112a of the body 112 may include a first receiving portion 112b that may be configured to slidably receive the pin member 116 while a second end 112c of the body 112 may include a second receiving portion 112d that may be configured to slidably receive the push mechanism 114.

The push mechanism 114 of the actuator 108 may include a suitable design, a suitable structure, and a suitable configuration to enable the pin member 116 to linearly extend from the first receiving portion 112b or retract back inside the body 112 through the first receiving portion 112b. The push mechanism 114 may include a plunger 114a and a mechanical implement (not shown) coupled to the plunger 114a. Examples of the mechanical implement may include, but not limited to, a helical spring, a torsion spring, a conical spring, a spiral spring, and the like. The push mechanism 114 may also include additional elements that are omitted for the sake of brevity. The plunger 114a may be at least be partially disposed in the body 112 through the second receiving portion 112d of the body 112. Additionally, the plunger 114a may include a plunger cap 114b that may have a substantially mushroom-shaped structure or any other suitable structure. The plunger 114a and the plunger cap 114b may be coupled by an interference fit. Alternatively, a suitable coupling agent, for example, an adhesive may couple the plunger 114a and the plunger cap 114b.

The pin member 116 of the actuator 108 may include a suitable design, a suitable structure, and a suitable configuration, to mate with the bolt insertion-hole 122a of the door holder 122. The pin member 116 may be slidably coupled and at least partially disposed in the first receiving portion 112b of the body 112, and resiliently biased with the push mechanism 114 through the mechanical implement, such that, a movement in the push mechanism 114 may trigger a movement of the pin member 116. In an embodiment, a first portion 116a of the pin member 116 may be circumferentially filleted to reduce the wear of the pin member 116 and to improve the connection between the pin member 116 and the bolt insertion-hole 122a. When the plunger 114a is pressed against the mechanical implement, the pin member 116 may be configured to linearly extend from the first receiving portion 112b of the body 112 along a first direction 124a. When the plunger 114a is released, the pin member 116 may be configured to linearly retract towards the first receiving portion 112b of the body 112 along a second direction 124b.

The locking element 118 of the actuator 108 may include a suitable design, a suitable structure, and a suitable configuration, to lock with the bolt insertion-hole 122a of the door holder 122. The locking element 118 may be more or less than two in number and may have a substantially spherical shape, for example, a ball bearing. Additionally, or alternatively, the locking element 118 may include any suitable structure, for example, a rectangular detent structure, a square tab structure, and the like. The locking element 118 may be radially disposed within the pin member 116 and resiliently biased with the pin member 116, such that, a linear traction of the pin member 116 may control a radial traction of the locking element 118. For example, when the pin member 116 is configured to linearly extend from the body 112, the locking element 118 may radially retract within the pin member 116, and when the pin member 116 is configured to linearly retract towards the body 112, the locking element 118 may radially extend from the pin member 116.

Figure 3A:
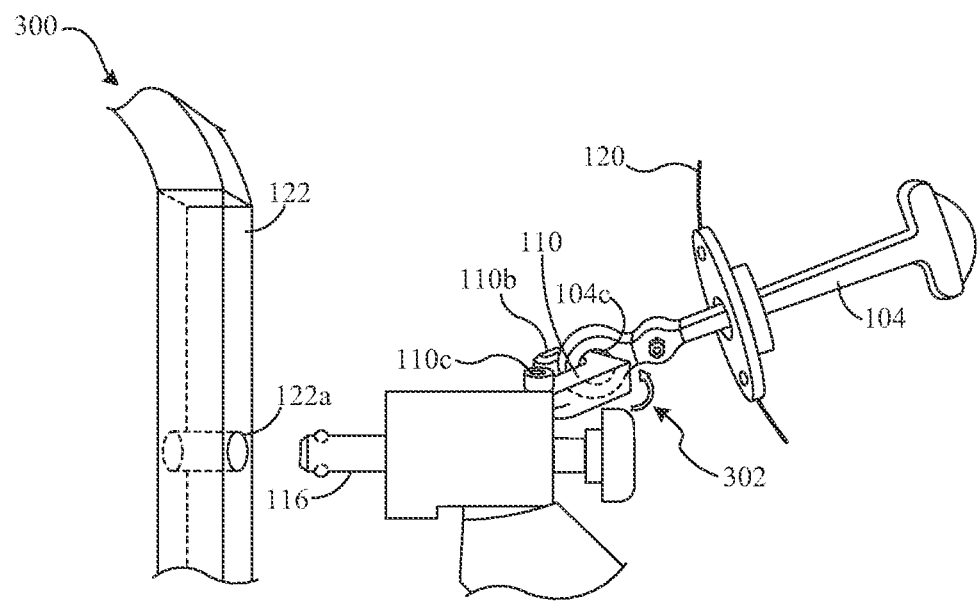
FIGS. 3A, 3B, 3C, 3D, and 3E, collectively, illustrate an exemplary scenario for installation of a door checker, in accordance with an embodiment of the disclosure.
Figure 3B:
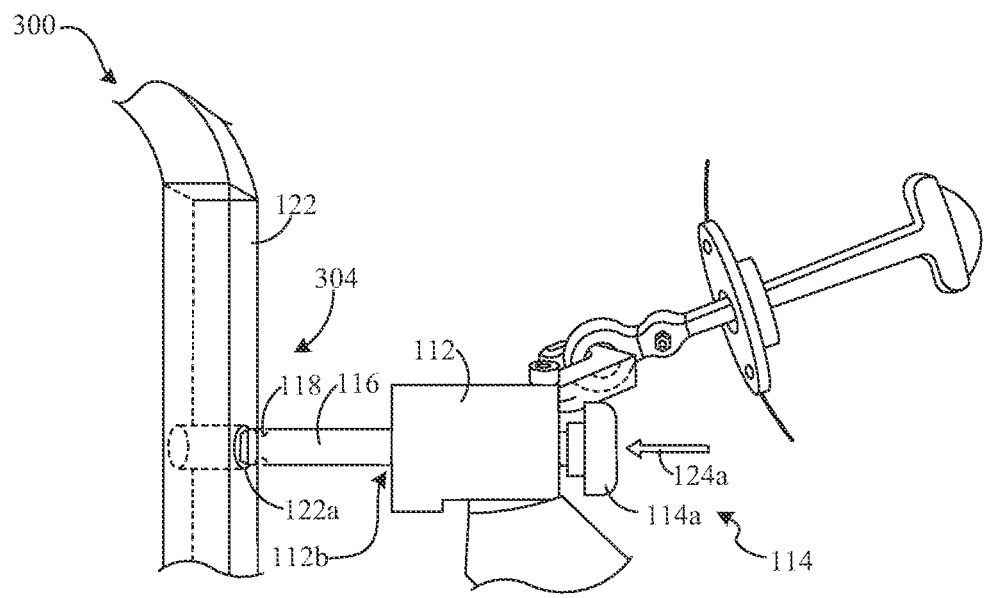
Figure 3C:
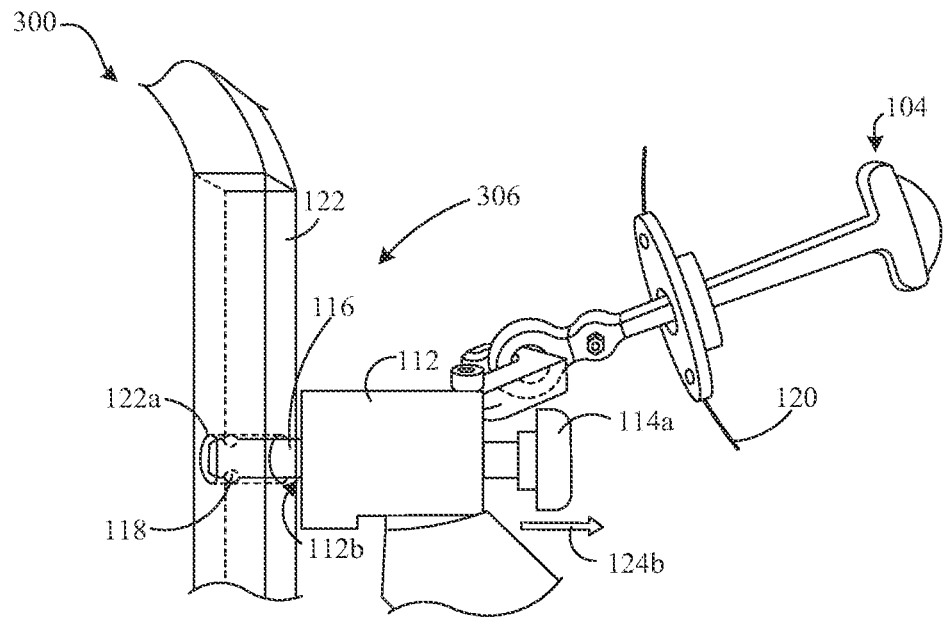

When the push mechanism 114 is configured to be in an engaged state (shown in FIG. 3B), the pin member 116 may be configured to linearly extend from the body 112 along the first direction 124a and retract the locking element 118 within the pin member 116, so as to mate the pin member 116 with the bolt insertion-hole 122a of the door holder 122. When the push mechanism 114 is configured to be released from the engaged state, the locking element 118 may be configured to radially protrude from the pin member 116 to lock the pin member 116 to the bolt insertion-hole 122a of the door holder 122.

More specifically, in the engaged state, the plunger 114a may be configured to at least partially extend inside the body 112 to push the mechanical implement of the push mechanism 114 to linearly extend the pin member 116 from the first receiving portion 112b and to radially retract the locking element 118 within the pin member 116. During release from the engaged state, the plunger 114a may be configured to at least partially extend outside the body 112 to pull the mechanical implement to linearly retract the pin member 116 into the first receiving portion 112b and to radially protrude the locking element 118 from the pin member 116 so as to lock the pin member 116 to the bolt insertion-hole 122a of the door holder 122. Once the locking element 118 is locked to the bolt insertion hole of door holder 122, the bolt-hole 104c of the door checker 104 may still be left in a disengaged state. Therefore, the hook member 110 may be used to engage with the bolt-hole 104c so that both the bolt insertion-hole 122a and the bolt-hole 104c are locked with the pin member 116 and the hook member 110, respectively.

The hook member 110 may include a suitable design, a suitable structure, and a suitable configuration, to couple with the door checker 104. The hook member 110 may include a substantially curved portion, for example, a C-shaped curved portion, a U-shaped curved portion, or a J-shaped curved portion. The substantially curved portion of the hook member 110 may be filleted to reduce the wearing of the hook member 110 and improve the connection between the hook member 110 and the bolt-hole 104c of the door checker 104.

The substantially curved portion of the hook member 110 may include a first end 110a and a second end 110b. In an embodiment, the first end 112a of the hook member 110 may be configured to be pivotally coupled with the actuator 108 through a pivot point 110c. The hook member 110 may be configured to rotate along the pivot point 110c such that the second end 110b of the hook member 110 is aligned with the bolt-hole 104c of the door checker 104. Alternatively, the first end 110a of the hook member 110 may be configured to be pivotally coupled with the handle 106 through the pivot point 110c. The pivot point 110c may be formed by fastening the first end 110a of the hook member 110 with one of the handle 106 or the actuator 108 through a suitable fastening arrangement, such as, a screw arrangement or a movable rivet arrangement. The second end 110b of the hook member 110 may be configured to be engaged with the bolt-hole 104c of the door checker 104. The hook member 110 may be made of a stainless steel material or any suitable lightweight material, for example, a plastic, an alloy (such as an aluminum alloy), or a composite material (such as a carbon fiber composite), and the like.

Figure 3D:
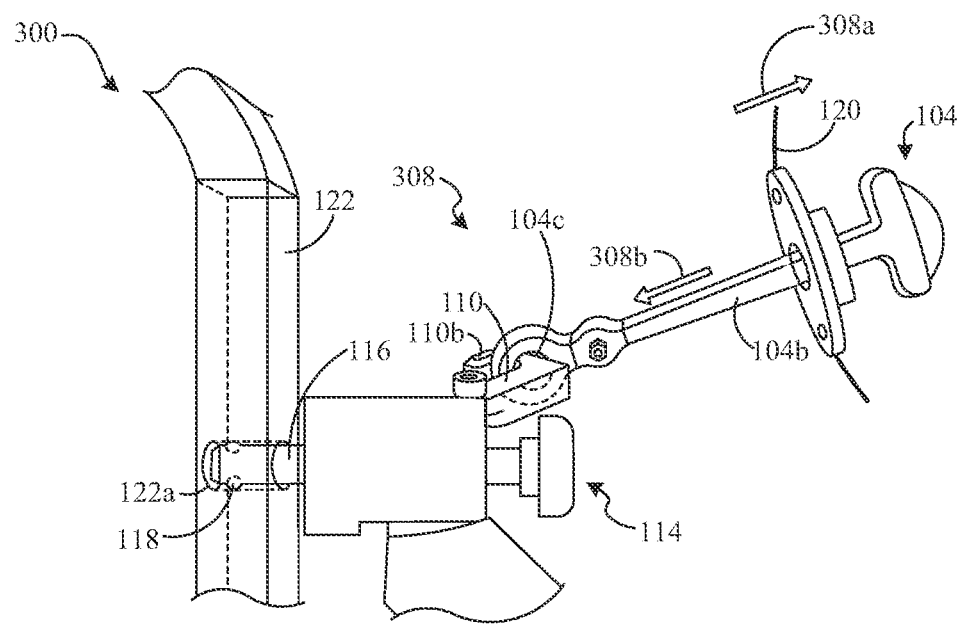

While the door checker 104 is in a retracted state within the door body 120, the pin member 116 may be locked to the bolt insertion-hole 122a of the door holder 122 and the second end 110b of the hook member 110 may be engaged with the bolt-hole 104c of the door checker 104. A movement (shown in FIG. 3D) of the door body 120 may cause the door checker 104 to extend from the door body 120 towards the door holder 122, by virtue of the weight of the door body 120. Upon extension of the door checker 104, the push mechanism 114 may be configured to be set back to the engaged state to radially retract the locking element 118 inside the pin member 116 so as to unlock and remove the pin member 116 from the bolt insertion-hole 122a. Upon removal of the pin member 116 from the bolt insertion-hole 122a, the second end 110b of the hook member 110 may be configured to be released from the bolt-hole 104c of the door checker 104.

Figure 2:
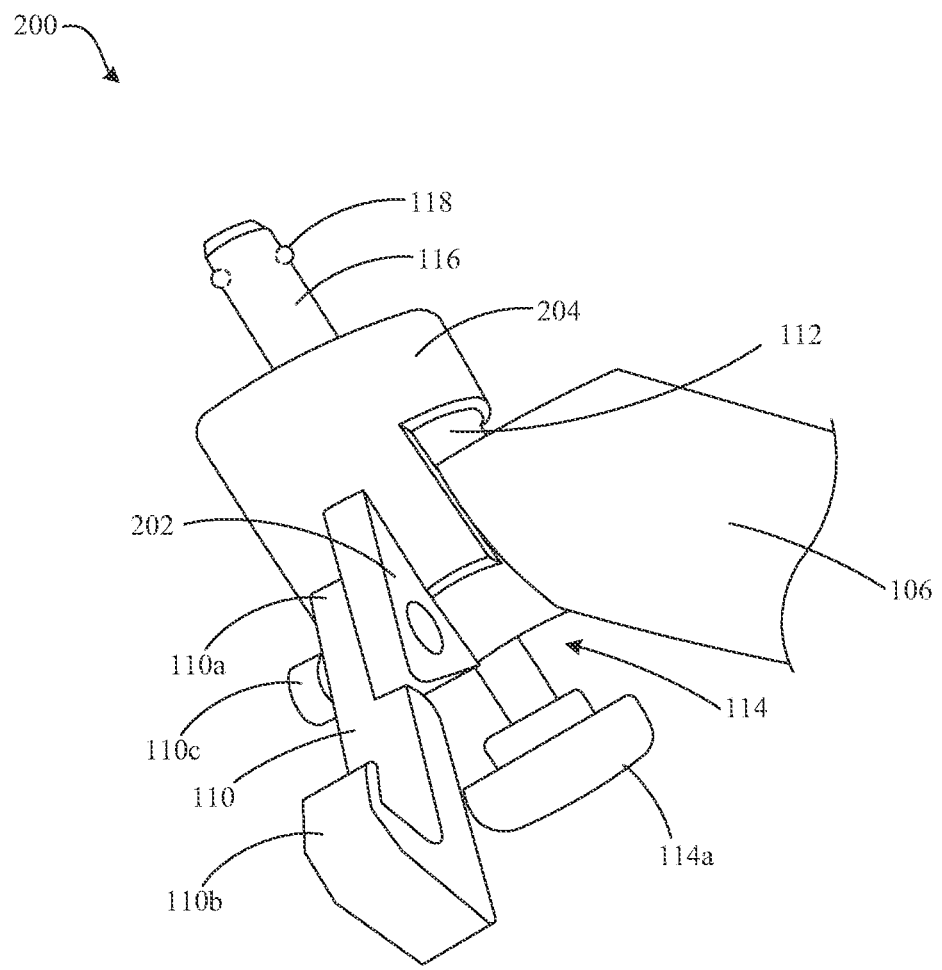
FIG. 2 is a diagram that illustrates a view of the apparatus of FIG. 1, in accordance with an embodiment of the disclosure.

FIG. 2 is a diagram that illustrates a view of the apparatus of FIG. 1, in accordance with an embodiment of the disclosure. FIG. 2 is explained in conjunction with FIG. 1. With reference to FIG. 2, there is shown a view 200 of the apparatus 102 of FIG. 1. The apparatus 102 may include a flange element 202 that may be coupled to the actuator 108. Additionally, or alternatively, a jacket 204 may be configured to substantially enclose the body 112 so as to offer protection to the body 112. In one embodiment, the flange element 202 may be radially coupled with the body 112 of the actuator 108 through a suitable fastening arrangement, for example, a screw, a bolt and nut, and like. In another embodiment, the flange element 202 may be coupled with the actuator 108 through a suitable permanent joint, for example, a welding joint, a rivet joint, and the like. In another embodiment, the flange element 202 may be integrally formed from the body of the actuator 108 as a single-piece. The flange element 202 may be configured to act as an interface between the actuator 108 and the first end 110a of the hook member 110. The first end 110a of the hook member 110 may be pivotally coupled to the flange element 202.

Figure 3E:
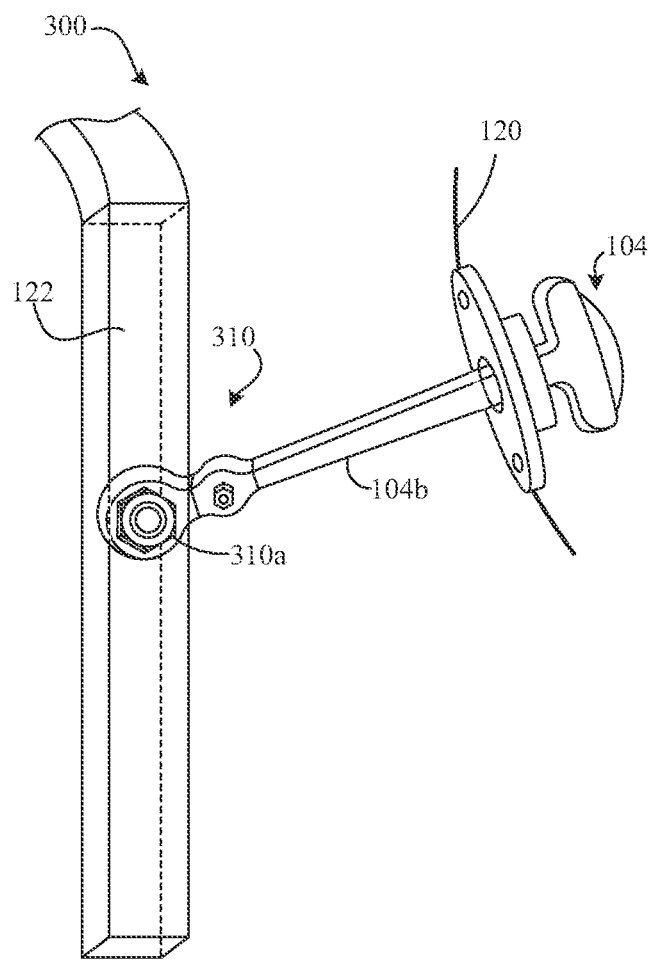

FIGS. 3A, 3B, 3C, 3D, and 3E, collectively, illustrate an exemplary scenario for installation of a door checker, in accordance with an embodiment of the disclosure. FIGS. 3A, 3B, 3C, 3D, and 3E are explained in conjunction with FIGS. 1 and 2. With reference to FIGS. 3A, 3B, 3C, 3D, and 3E, there is shown an exemplary scenario 300 for installation of the door checker 104. The exemplary scenario 300 for installation of the door checker 104 may include a first engagement operation 302 (FIG. 3A), a second engagement operation 304 (FIG. 3B), a release operation 306 (FIG. 3C), a door body movement 308 (FIG. 3D), and a fastening operation 310 (FIG. 3E). The exemplary scenario 300 may be illustrated as discrete operations, such as 302, 304, 306, 308, and 310. However, in certain embodiments, such discrete operations may be further divided into additional operations, combined into fewer operations, or eliminated, depending on the particular implementation without any deviation from the scope of the disclosure.

In the first engagement operation 302, the hook member 110 may be rotated along the pivot point 110c such that the second end 110b of the hook member 110 is aligned with the bolt-hole 104c of the door checker 104. Thereafter, the hook member 110 may be configured to engage with the bolt-hole 104c of the door checker 104.

In the second engagement operation 304, the plunger 114a may be pressed along the first direction 124a to at least partially extend inside the body 112 so as to push the mechanical implement of the push mechanism 114 to linearly extend the pin member 116 from the first receiving portion 112b. The pin member 116 may extend along the first direction 124a towards the bolt insertion-hole 122a of the door holder 122. When the pin member 116 linearly extends along the first direction 124a, the mechanical implement may configure the locking element 118 to radially retract within the pin member 116 so as to mate the pin member 116 with the bolt insertion-hole 122a of the door holder 122.

In the release operation 306, the plunger 114a may be released along the second direction 124b to at least partially extend outside the body 112 so as to pull the mechanical implement and to linearly retract the pin member 116 into the first receiving portion 112b. Further, when the pin member 116 linearly retracts along the second direction 124b, the mechanical implement may configure the locking element 118 to radially protrude from the pin member 116 so as to lock the pin member 116 to the bolt insertion-hole 122a of the door holder 122.

In the door body movement 308, the door body 120 may be moved towards a third direction 308a, which is away from the door holder 122. When the pin member 116 is locked to the bolt insertion-hole 122a of the door holder 122 and the second end 110b of the hook member 110 is engaged with the bolt-hole 104c of the door checker 104, the movement of the door body 120 along the third direction 308a may cause the door checker 104 (i.e. the checker arm 104b) to extend from the door body 120 towards the door holder 122 in a fourth direction 308b. The installation process for the door checker 104 becomes easier when the door checker 104 extends from the door body 120 merely by virtue of the weight of the door body 120, as the door body 120 moves away from the door holder 122. Upon extension of the door checker 104, the push mechanism 114 may be configured to be set back to an engaged state (at 304) to radially retract the locking element 118 inside the pin member 116 so as to unlock and remove the pin member 116 from the bolt insertion-hole 122a. Upon removal of the pin member 116 from the bolt insertion-hole 122a, the second end 110b of the hook member 110 may be configured to be released from the bolt-hole 104c of the door checker 104.

In the fastening operation 310, once the door checker 104 extends outside the door body 120, the bolt-hole 104c on the checker arm 104b may be aligned with the bolt-insertion hole 122a of the door holder 122 and the checker arm 104b may be fastened to the door holder 122, via a suitable fastening element, for example, a bolt 310a.

Figure 4:
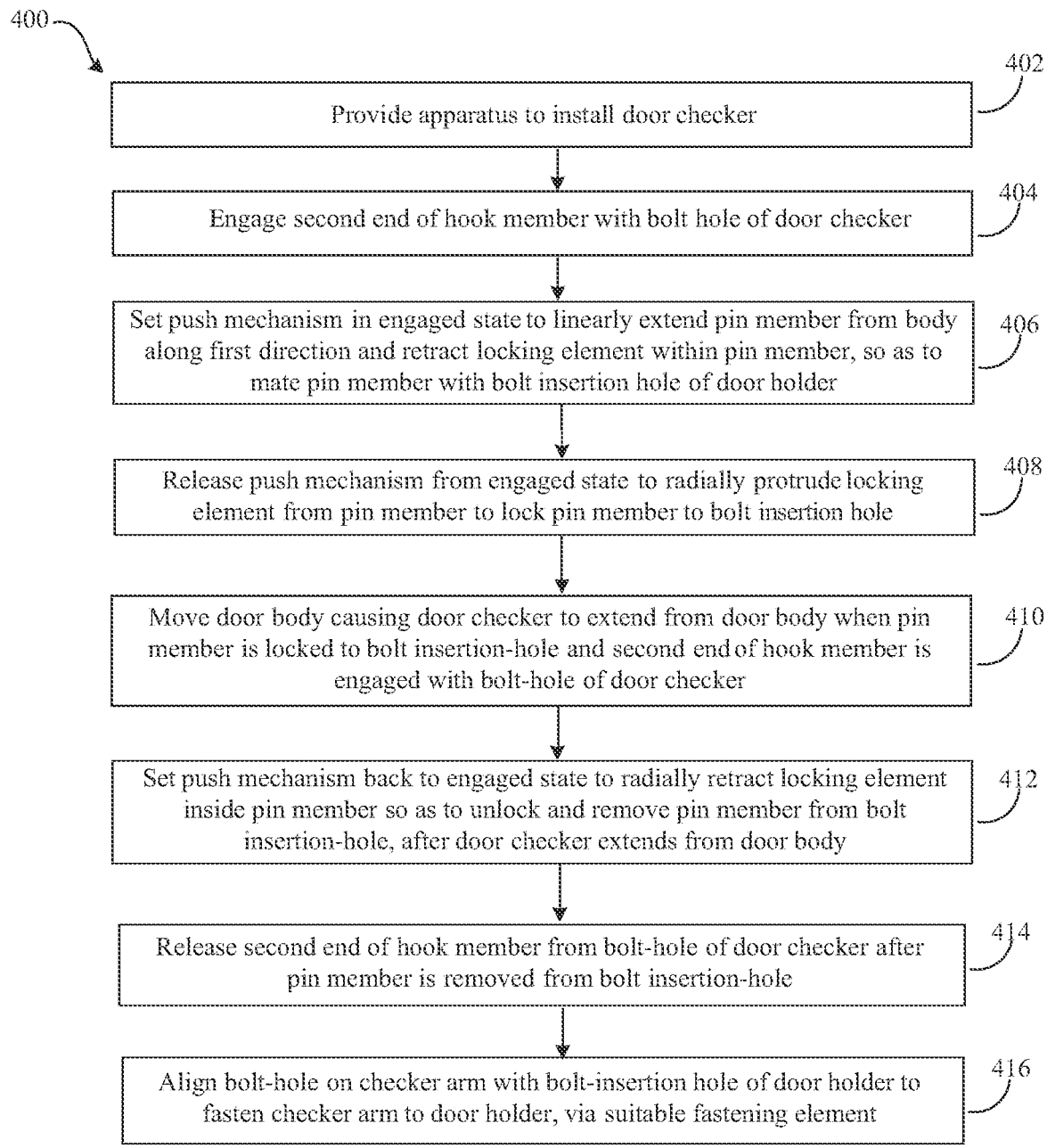
FIG. 4 illustrates a flowchart of an exemplary method for installation of a door checker 104, in accordance with an embodiment of the disclosure.

FIG. 4 illustrates a flowchart of an exemplary method for installation of a door checker 104, in accordance with an embodiment of the disclosure. FIG. 4 is explained in conjunction with FIGS. 1, 2, 3A, 3B, 3C, 3D, and 3E. With reference to FIG. 4, there is shown a flowchart 400 that depicts an exemplary method for installation of the door checker 104. The method illustrated in the flowchart 400 may start from 402.

At 402, the apparatus 102 may be provided for installation of the door checker 104. The apparatus 102 may include the actuator 108 and the hook member 110 having the first end 110a coupled to the actuator 108. The actuator 108 may include the body 112, the push mechanism 114 coupled to the body 112, the pin member 116 at least partially disposed within the body 112 and coupled to the push mechanism 114, and the locking element 118 radially disposed within the pin member 116. Further structural and functional details of the apparatus 102 are described, in detail, for example, in FIGS. 1, 2, 3A, 3B, 3C, 3D, and 3E.

At 404, the second end 110b of the hook member 110 may be engaged with the bolt-hole 104c of the door checker 104. Additionally, before the engagement with the bolt-hole 104c, the hook member 110 may be rotated along the pivot point 110c such that the second end 110b of the hook member 110 is aligned with the bolt-hole 104c of the door checker 104. The engagement of second end 110b of the hook member 110 with the bolt-hole 104c of the door checker 104 is described, in detail, for example, in FIGS. 1, 2, 3A, 3B, 3C, 3D, and 3E.

At 406, the push mechanism 114 may be set in the engaged state to linearly extend the pin member 116 from the body 112 along the first direction 124a and retract the locking element 118 within the pin member 116, so as to mate the pin member 116 with the bolt insertion-hole 122a of the door holder 122. More specifically, in setting, the plunger 114a may extend at least partially inside the body 112 to push the mechanical implement of the push mechanism 114 so as to linearly extend the pin member 116 from the first receiving portion 112b and to radially retract the locking element 118 within the pin member 116. The alignment and insertion of the pin member 116 with the bolt insertion-hole 122a is described, in detail, for example, in FIGS. 1, 2, 3A, 3B, 3C, 3D, and 3E.

At 408, the push mechanism 114 may be released from the engaged state to radially protrude the locking element 118 from the pin member 116 to lock the pin member 116 to the bolt insertion-hole 122a. The protrusion of the locking element 118 to lock the pin member 116 to the bolt insertion-hole 122a is described, in detail, for example, in FIGS. 1, 2, 3A, 3B, 3C, 3D, and 3E.

At 410, the door body 120 may be moved, thereby causing the door checker 104 to extend from the door body 120 when the pin member 116 is locked to the bolt insertion-hole 122a and the second end 110b of the hook member 110 is engaged with the bolt-hole 104c of the door checker 104.

At 412, the push mechanism 114 may be set back to the engaged state to radially retract the locking element 118 inside the pin member 116 so as to unlock and remove the pin member 116 from the bolt insertion-hole 122a, after the door checker 104 extends from the door body 120.

At 414, the second end 110b of the hook member 110 may be released from the bolt-hole 104c of the door checker 104 after the pin member 116 is removed from the bolt insertion-hole 122a.

At 416, the bolt-hole 104c on the checker arm 104b may be aligned with the bolt-insertion hole 122a of the door holder 122 to fasten the checker arm 104b to the door holder 122, via a suitable fastening element.

The flowchart 400 is illustrated as discrete operations, such as 402, 404, 406, 408, 410, 412, 414, and 416. However, in certain embodiments, such discrete operations may be further divided into additional operations, combined into fewer operations, or eliminated, depending on the particular implementation without any deviation from the scope of the disclosure.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. An apparatus, comprising:
   a handle;
   an actuator coupled to the handle; and
   a hook member comprising a first end coupled to the actuator and a second end configured to engage with a bolt hole of a door checker, the actuator comprising:
      a body;
      a push mechanism coupled to the body;
      a pin member at least partially disposed within the body and coupled to the push mechanism; and
      a locking element radially disposed within the pin member,
         wherein, when the push mechanism is in an engaged state, the pin member is configured to linearly extend from the body along a first direction and retract the locking element within the pin member, so as to mate the pin member with a bolt insertion-hole of a door holder, and
         wherein, when the push mechanism is released from the engaged state, the locking element is configured to radially protrude from the pin member to lock the pin member to the bolt insertion-hole.

2. The apparatus according to claim 1, wherein the first end of the hook member is pivotally coupled to a flange element, which is radially coupled to the body of the actuator.

3. The apparatus according to claim 1, wherein the hook member is configured to rotate along a pivot point such that the second end of the hook member is aligned with the bolt-hole of the door checker.

4. The apparatus according to claim 1, wherein the body of the actuator is substantially a cylindrical structure, and
   wherein a first end of the body comprises a first receiving portion configured to slidably receive the pin member, and
   a second end of the body comprises a second receiving portion configured to slidably receive a plunger of the push mechanism.

5. The apparatus according to claim 4, wherein, in the engaged state, the plunger is configured to at least partially extend inside the body to push at least one mechanical implement of the push mechanism to linearly extend the pin member from the first receiving portion and to radially retract the locking element from the pin member.

6. The apparatus according to claim 4, wherein, when the plunger is released from the engaged state, the plunger is configured to at least partially extend outside the body to pull the at least one mechanical implement to linearly retract the pin member into the first receiving portion and to radially protrude the locking element from the pin member to lock the pin member to the bolt insertion-hole.

7. The apparatus according to claim 1, wherein, in a relaxed state, the door checker is configured to retract within a door body, and
   wherein a movement of the door body causes the door checker to extend from the door body when the pin member is locked to the bolt insertion-hole and the second end of the hook member is engaged with the bolt-hole of the door checker.

8. The apparatus according to claim 7, wherein when the door checker extends from the door body, the push mechanism is configured to be set back to the engaged state to radially retract the locking element inside the pin member so as to unlock and remove the pin member from the bolt insertion-hole.

9. The apparatus according to claim 8, wherein the second end of the hook member is configured to be released from the bolt hole of the door checker when the pin member is removed from the bolt insertion-hole.

10. The apparatus according to claim 1, wherein the locking element comprises a ball bearing.

11. The apparatus according to claim 1, wherein the handle is substantially a cylindrical structure comprising a first portion shaped to a wedge profile.

12. An apparatus, comprising:
    an actuator; and
    a hook member comprising a first end coupled to the actuator, the actuator comprising:
       a body;
       a push mechanism coupled to the body;
       a pin member at least partially disposed within the body and coupled to the push mechanism; and
       a locking element radially disposed within the pin member.

13. The apparatus according to claim 12, wherein the first end of the hook member is pivotally coupled to a flange element, which is radially coupled to the body of the actuator.

14. The apparatus according to claim 12, further comprising a handle coupled to the actuator, wherein the handle is substantially a cylindrical structure comprising a first portion shaped to a wedge profile.

* * * * *